United States Patent
Dunjic et al.

(10) Patent No.: US 11,972,421 B2
(45) Date of Patent: Apr. 30, 2024

(54) SYSTEM AND METHOD FOR EFFECTING A SECURE EVENT

(71) Applicant: The Toronto-Dominion Bank, Toronto (CA)

(72) Inventors: Milos Dunjic, Toronto (CA); Yubing Liu, Toronto (CA); Anthony Haituyen Nguyen, Toronto (CA); Daniel David Grinberg, Toronto (CA)

(73) Assignee: The Toronto-Dominion Bank, Toronto (CA)

(*) Notice: Subject to any disclaimer, the term of this patent is extended or adjusted under 35 U.S.C. 154(b) by 891 days.

(21) Appl. No.: 16/782,625

(22) Filed: Feb. 5, 2020

(65) Prior Publication Data
US 2021/0241269 A1     Aug. 5, 2021

(51) Int. Cl.
*G06Q 20/38* (2012.01)
*G06K 19/06* (2006.01)
(Continued)

(52) U.S. Cl.
CPC ... *G06Q 20/3829* (2013.01); *G06K 19/06037* (2013.01); *G06Q 10/0838* (2013.01);
(Continued)

(58) Field of Classification Search
CPC ... H04L 9/085; H04L 2209/24; G06Q 10/087; G06F 21/40
See application file for complete search history.

(56) References Cited

U.S. PATENT DOCUMENTS

| 7,925,586 B2 | 12/2011 | Cole |
| 8,210,429 B1 | 3/2012 | Bohen |

(Continued)

FOREIGN PATENT DOCUMENTS

WO    2019021200 A1    1/2019

OTHER PUBLICATIONS

"Snapdeal to deliver cash at home," https://www.livemint.com/Companies/oZktERMZJCErbHby9DWrQO/Snapdeal-to-deliver-cash-at-home.html, Dec. 22, 2016.
(Continued)

*Primary Examiner* — Steven S Kim
*Assistant Examiner* — Sima Asgari
(74) *Attorney, Agent, or Firm* — Duane Morris LLP

(57) ABSTRACT

Systems and methods for effecting secure transactions are described. A processing device, when executing computer-executable instructions: receives from a requesting entity computing system a transaction request for a payload. The transaction request is transmitted to delivery entity computing system associated with a delivery entity identifier and geographic location. An encryption key, random number and a unique request identifier are generated and transmitted to requesting and delivery entity computing systems. In response to receiving a delivery transaction confirmation from the delivery entity computing system, the processing device verifies the secure transaction. After receiving a requestor transaction confirmation from the requesting entity computing system (indicating a verified transfer of the payload), a payload reimbursement is transferred to a delivery transaction account from a requestor transaction account.

12 Claims, 10 Drawing Sheets

(51) Int. Cl.
  G06Q 10/083    (2023.01)
  G06Q 20/10     (2012.01)
  G06Q 20/40     (2012.01)
  G06Q 30/018    (2023.01)
  H04L 9/08      (2006.01)
  H04L 9/32      (2006.01)

(52) U.S. Cl.
  CPC ....... G06Q 20/108 (2013.01); G06Q 20/4015 (2020.05); G06Q 30/018 (2013.01); H04L 9/085 (2013.01); H04L 9/3226 (2013.01); G06Q 2220/00 (2013.01)

(56) References Cited

U.S. PATENT DOCUMENTS

| | | | |
|---|---|---|---|
| 8,577,802 B1 | 5/2013 | Nichols | |
| 8,849,685 B2 | 9/2014 | Oden | |
| 9,626,701 B2 | 4/2017 | Capps | |
| 10,217,302 B2 | 2/2019 | Rephlo | |
| 2002/0095374 A1 | 7/2002 | Ellis | |
| 2005/0144126 A1 | 6/2005 | Commodore | |
| 2006/0034456 A1* | 2/2006 | McGough | H04L 9/0891 380/30 |
| 2010/0169651 A1* | 7/2010 | Scheidt | H04L 9/3231 713/176 |
| 2011/0116628 A1* | 5/2011 | Wack | H04L 9/0866 380/44 |
| 2012/0121088 A1* | 5/2012 | Hata | H04L 9/0836 380/255 |
| 2013/0346302 A1* | 12/2013 | Purves | G06Q 20/102 705/40 |
| 2015/0326392 A1* | 11/2015 | Cheng | H04L 9/14 380/28 |
| 2015/0378842 A1* | 12/2015 | Tomlinson | G06F 21/40 380/28 |
| 2017/0017958 A1 | 1/2017 | Scott | |
| 2017/0124511 A1* | 5/2017 | Mueller | H04W 4/029 |
| 2018/0089668 A1 | 3/2018 | Wong | |
| 2018/0005193 A1 | 4/2018 | Crandall | |
| 2018/0130037 A1 | 10/2018 | Dhuliphalla | |

OTHER PUBLICATIONS

Payments Journal, "On-ATM—The rising culture of on-demand cash," https://www.paymentsjournal.com/on-atm-the-rising-culture-of-on-demand-cash/, Feb. 26, 2019.

Carmel Deamicis, "This company does no-demand cash and no, it's not an ATM," https://gigaom.com/2014/10/13/this-company-does-on-demand-cash-and-no-its-not-an-atm/, Oct. 13, 2014.

Alyson Wyers, "Human ATM Services," https://www.trendhunter.com/trends/ondemand-cash, Oct. 22, 2014.

"Yes Bank partners with Ola to provide Cash-on-Demand at Customer's Doorstep," https://www.indiainfoline.com/article/news-top-story/yes-bank-partners-with-ola-to-provide-cash-on-demand-at-customer%E2%80%99s-doorstep-116121900076_1.html. Dec. 19, 2016.

* cited by examiner

SYSTEM AND METHOD FOR EFFECTING A SECURE EVENT

FIELD

The specification relates generally to secure events, and specifically to systems and methods to effect secure transactions between at least two entities.

BACKGROUND

In an increasingly digital world, more and more people are often not carrying cash; however, cash is still a preferred method of payment for many daily transactions. Indeed, individuals may find themselves in a situation where the purchase must be made in cash, but it may not be convenient or easy for the individual to access an Automatic Teller Machine (ATM) or bank branch at the individual's present time and location.

SUMMARY

According to some embodiments of the application, there is provided a computing system for effecting a secure transaction comprising: a memory storing computer-executable instructions; and a processing device coupled to the memory. The computer-executable instructions when executed by the processing device cause the processing device to: receive, over a network, a transaction request to receive at least one payload from a requesting entity computing system associated with a requestor entity, the transaction request comprising a requesting entity identifier, a requestor geographic location identifier, at least one transaction payload attribute and at least one transaction attribute; transmit, over the network, the transaction request to a delivery entity computing system associated with a delivery entity, a delivery entity identifier and a delivery entity geographic location; generate an encryption key, a random number and a unique request identifier; receive, over the network, a delivery transaction confirmation from the delivery entity computing system; in response to receiving the delivery transaction confirmation, verify the secure transaction; receive, over the network, a requestor transaction confirmation from the requesting entity computing system, the requestor transaction confirmation indicating a verified transfer of the at least one payload from the delivery entity to the requestor entity; and after receipt of the requestor transaction confirmation, transfer a payload reimbursement from a requestor transaction account associated with the requestor entity to a delivery transaction account associated with the delivery entity. According to some embodiments, the at least one payload comprises one or more of cash and gold bullion. According to some embodiments, the at least one transaction attribute comprises one or more of a delivery time, a delivery date, receipt instructions and a preferred payment method for the payload reimbursement. According to some embodiments, the network is a secure network.

According to some embodiments, the computer-executable instructions when executed by the processing device further cause the processing device to: split the encryption key into a requestor entity key portion and a delivery entity key portion; split the random number into a requestor entity number portion and a delivery entity number portion; generate a requestor matrix code, the requestor matrix code comprising the requestor entity number portion, the unique request identifier, the requesting entity identifier and the requestor entity key portion; generate a delivery matrix code, the delivery matrix code comprising the delivery entity number portion, the unique request identifier, the delivery entity identifier and the delivery entity key portion; and transmit, over the network, the requestor matrix code to the requesting entity computing system and the delivery matrix code to the delivery entity computing system. According to some embodiments, the requestor matrix code and/or the delivery matrix code is a QR code.

According to some embodiments, the computer-executable instructions when executed by the processing device further cause the processing device to: prior to the receipt of the delivery transaction confirmation, transfer a reimbursement amount from the requestor transaction account to a requestor escrow account, and transmit an escrow confirmation to the delivery entity computing system; wherein the transfer of the payload reimbursement comprises transferring the payload reimbursement from the requestor escrow account to the delivery transaction account.

According to some embodiments, the payload attribute comprises one or more of a payload type and a payload monetary valuation.

According to some embodiments, the computer-executable instructions when executed by the processing device further cause the processing device to: prior to the receipt of the transaction request, generate a requestor account profile in response to receiving a registration request from the requesting entity computing system, wherein the registration request comprises at least one payment method, and verify the at least one payment method and program eligibility of the requestor entity.

According to some embodiments, the delivery entity computing system further comprises a memory storing computer-executable instructions and a processing device coupled to the memory, the computer-executable instructions when executed by the processing device to: when the requesting entity computing system and the delivery entity computing system are geographically proximate, in accordance with the requestor geographic location identifier, read the requestor matrix code to obtain the requestor entity key portion and the requestor entity number portion, combine the obtained requesting entity key portion with the delivery entity key portion to obtain a complete delivery encryption key and combine the requestor entity number portion with the delivery entity number portion to obtain a complete delivery random number, generate a delivery cryptogram based on the complete delivery entity encryption key, the complete delivery random number, the unique request identifier, the requesting entity identifier, the at least one transaction payload attribute and the at least one transaction attribute, wherein the delivery transaction confirmation comprises the delivery cryptogram, and transmit, over the network, the delivery cryptogram to the processing device of the computing system for effecting the secure transaction. In verifying the transaction, the computer-executable instructions when executed by the processing device of the computing system for effecting the secure transaction further cause the processing device to: generate a verification cryptogram based on the encryption key, the random number, the unique request identifier, the requesting entity identifier, the delivery entity identifier, the at least one transaction payload attribute and the at least one transaction attribute, using the encryption key, decrypt both the received delivery cryptogram, thereby generating a delivery cryptogram result, and the verification cryptogram, thereby generating a verification cryptogram result, compare the delivery cryptogram result with the verification cryptogram result, and when the delivery cryptogram result matches the verification cryptogram result, transmit a transaction verification confirmation to the delivery entity computing system, and when the delivery cryptogram result does not match the verification cryptogram result, transmit a decline transaction notification to the delivery entity computing system.

According to some embodiments, the requesting entity computing system further comprises a memory storing computer-executable instructions and a processing device coupled to the memory, the computer-executable instructions when executed by the processing device causing the processing device to: when the requesting entity computing system and the delivery entity computing system are geographically proximate, in accordance with the requestor geographic location identifier: read the delivery matrix code to obtain the delivery entity key portion, the delivery entity number portion and the delivery entity identifier; combine the obtained delivery entity key portion with the requestor entity key portion to obtain a complete requestor encryption key and combine the obtained delivery entity number portion with the requestor number portion to obtain a complete requestor random number; generate a requestor cryptogram based on the complete requestor entity encryption key, the complete requestor random number, the unique request identifier, the delivery entity identifier, the requesting entity identifier, the at least one transaction payload attribute and the at least one transaction attribute; and transmit, over the network, the requestor transaction confirmation to the processing device of the computing system for effecting the secure transaction, wherein the requestor transaction confirmation comprises the requestor cryptogram. The computer-executable instructions when executed by the processing device of the computing system for effecting the secure transaction further cause the processing device to: using the encryption key, decrypt the requestor cryptogram, thereby generating a requestor cryptogram result; compare the requestor cryptogram result with the verification cryptogram result; and when the requestor cryptogram result matches the verification cryptogram result, transfer the payload reimbursement from the requestor transaction account to the delivery transaction account.

According to some embodiments, the computing system further comprises: a plurality of delivery entity computing systems associated with a plurality of delivery entities; wherein the delivery entity computing system is a selected delivery entity computing system of the plurality of delivery entity computing systems.

According to some embodiments, there is provided a non-transitory computer-readable medium for effecting a secure transaction, the computer-readable medium comprising computer-executable instructions for: receiving, over a network, a transaction request to receive at least one payload from a requesting entity computing system associated with a requestor entity, the transaction request comprising: a requesting entity identifier, a requestor geographic location identifier, at least one transaction payload attribute and at least one transaction attribute; transmitting, over the network, the transaction request to a delivery entity computing system associated with a delivery entity, a delivery entity identifier and a delivery entity geographic location; generating an encryption key, a random number and a unique request identifier; receiving, over the network, a delivery transaction confirmation from the delivery entity computing system; in response to receiving the delivery transaction confirmation, verifying the secure transaction; receiving, over the network, a requestor transaction confirmation from the requesting entity computing system, the requestor transaction confirmation indicating a verified transfer of the at least one payload from the delivery entity to the requestor entity; and after receipt of the requestor transaction confirmation, transferring a payload reimbursement from a requestor transaction account associated with the requestor entity to a delivery transaction account associated with the delivery entity.

According to some embodiments, the computer-readable medium further comprises computer-executable instructions for: splitting the encryption key into a requestor entity key portion and a delivery entity key portion; splitting the random number into a requestor entity number portion and a delivery entity number portion; generating a requestor matrix code, the requestor matrix code comprising the requestor entity number portion, the unique request identifier, the requesting entity identifier and the requestor entity key portion; generating a delivery matrix code, the delivery matrix code comprising the delivery entity number portion, the unique request identifier, the delivery entity identifier and the delivery entity key portion; and transmitting, over the network, the requestor matrix code to the requesting entity computing system and the delivery matrix code to the delivery entity computing system.

According to some embodiments, the at least one transaction attribute comprises one or more of a delivery time, a delivery date, receipt instructions and a preferred payment method for the payload reimbursement.

According to some embodiments, the non-transitory computer-readable medium further comprise computer-executable instructions for: prior to the receipt of the delivery transaction confirmation, transferring a reimbursement amount from the requestor transaction account to a requestor escrow account, and transmitting an escrow confirmation to the delivery entity computing system; wherein transferring the payload reimbursement comprises transferring the payload reimbursement from the requestor escrow account to the delivery transaction account.

According to some embodiments, the at least one payload attribute comprises one or more of a payload type and a payload monetary valuation.

According to some embodiments, the non-transitory computer-readable medium further comprises computer-executable instructions for: prior to the receipt of the transaction request, generate a requestor account profile in response to receiving a registration request from the requesting entity computing system, wherein the registration request comprises at least one payment method, and verify the at least one payment method and program eligibility of the requestor entity.

According to some embodiments, there is provided a method for effecting a secure transaction comprising, via a processing device of an intermediary computing system: receiving, over a network, a transaction request to receive at least one payload from a requesting entity computing system associated with a requestor entity, the transaction request comprising: a requesting entity identifier, a requestor geographic location identifier, at least one transaction payload attribute and at least one transaction attribute; transmitting, over the network, the transaction request to a delivery entity computing system associated with a delivery entity, a delivery entity identifier and a delivery entity geographic location; generating an encryption key, a random number and a unique request identifier; transmitting, over the network, at least a portion of the encryption key, the random number and the unique request identifier to each of the requesting entity computing system and the delivery entity computing system; receiving, over the network, a delivery transaction confirmation from the delivery entity computing system; in response to receiving the delivery transaction confirmation, verifying the secure transaction; receiving, over the network, a requestor transaction confirmation from the requesting entity computing system, the requestor transaction confirmation indicating a verified transfer of the at least one payload from the delivery entity to the requestor entity; and after receipt of the requestor transaction confirmation, transferring a payload reimbursement from a requestor transaction account associated with the requestor entity to a delivery transaction account associated with the delivery entity.

According to some embodiments, the method further comprises: splitting the encryption key into a requestor entity key portion and a delivery entity key portion; splitting the random number into a requestor entity number portion and a delivery entity number portion; generating a requestor matrix code, the requestor matrix code comprising the requestor entity number portion, the unique request identifier, the requesting entity identifier and the requestor entity key portion; generating a delivery matrix code, the delivery matrix code comprising the delivery entity number portion, the unique request identifier, the delivery entity identifier and the delivery entity key portion; and transmitting, over the network, the requestor matrix code to the requesting entity computing system and the delivery matrix code to the delivery entity computing system.

According to some embodiments, when the requesting entity computing system and the delivery entity computing system are geographically proximate, in accordance with the requestor geographic location identifier, via a processing device of the delivery entity computing system: reading the requestor matrix code to obtain the requestor entity key portion and the requestor entity number portion, combining the obtained requesting entity key portion with the delivery entity key portion to obtain a complete delivery encryption key and combine the requestor entity number portion with the delivery entity number portion to obtain a complete delivery random number, generating a delivery cryptogram based on the complete delivery entity encryption key, the complete delivery random number, the unique request identifier, the requesting entity identifier, the at least one transaction payload attribute and the at least one transaction attribute, wherein the delivery transaction confirmation comprises the delivery cryptogram, and transmitting, over the network, the delivery cryptogram to the processing device of the computing system for effecting the secure transaction. In verifying the transaction, via the processing device of the intermediary computing system: generating a verification cryptogram based on the encryption key, the random number, the unique request identifier, the requesting entity identifier, the delivery entity identifier, the at least one transaction payload attribute and the at least one transaction attribute, using the encryption key, decrypting both the received delivery cryptogram, thereby generating a delivery cryptogram result, and the verification cryptogram, thereby generating a verification cryptogram result, comparing the delivery cryptogram result with the verification cryptogram result. When the delivery cryptogram result matches the verification cryptogram result, transmitting a transaction verification confirmation to the delivery entity computing system, and when the delivery cryptogram result does not match the verification cryptogram result, transmitting a decline transaction notification to the delivery entity computing system.

According to some embodiments, the method further comprises: when the requesting entity computing system and the delivery entity computing system are geographically proximate, in accordance with the requestor geographic location identifier, via a processing device of the requestor entity computing system: reading the delivery matrix code to obtain the delivery entity key portion, the delivery entity number portion and the delivery entity identifier, combining the obtained delivery entity key portion with the requestor entity key portion to obtain a complete requestor encryption key and combine the obtained delivery entity number portion with the requestor number portion to obtain a complete requestor random number, generating a requestor cryptogram based on the complete requestor entity encryption key, the complete requestor random number, the unique request identifier, the delivery entity identifier, the requesting entity identifier, the at least one transaction payload attribute and the at least one transaction attribute, and transmitting, over the network, the requestor transaction confirmation to the processing device of the computing system for effecting the secure transaction, wherein the requestor transaction confirmation comprises the requestor cryptogram. Via the processing device of the intermediary computing system, the method further comprises: using the encryption key, decrypting the requestor cryptogram, thereby generating a requestor cryptogram result; comparing the requestor cryptogram result with the verification cryptogram result; and when the requestor cryptogram result matches the verification cryptogram result, transferring the payload reimbursement from the requestor transaction account to the delivery transaction account.

BRIEF DESCRIPTIONS OF THE DRAWINGS

For a better understanding of the various aspects of the application described herein and to show more clearly how they may be carried into effect, reference will now be made, by way of example only, to the accompanying drawings in which.

DETAILED DESCRIPTION

Figure 1:
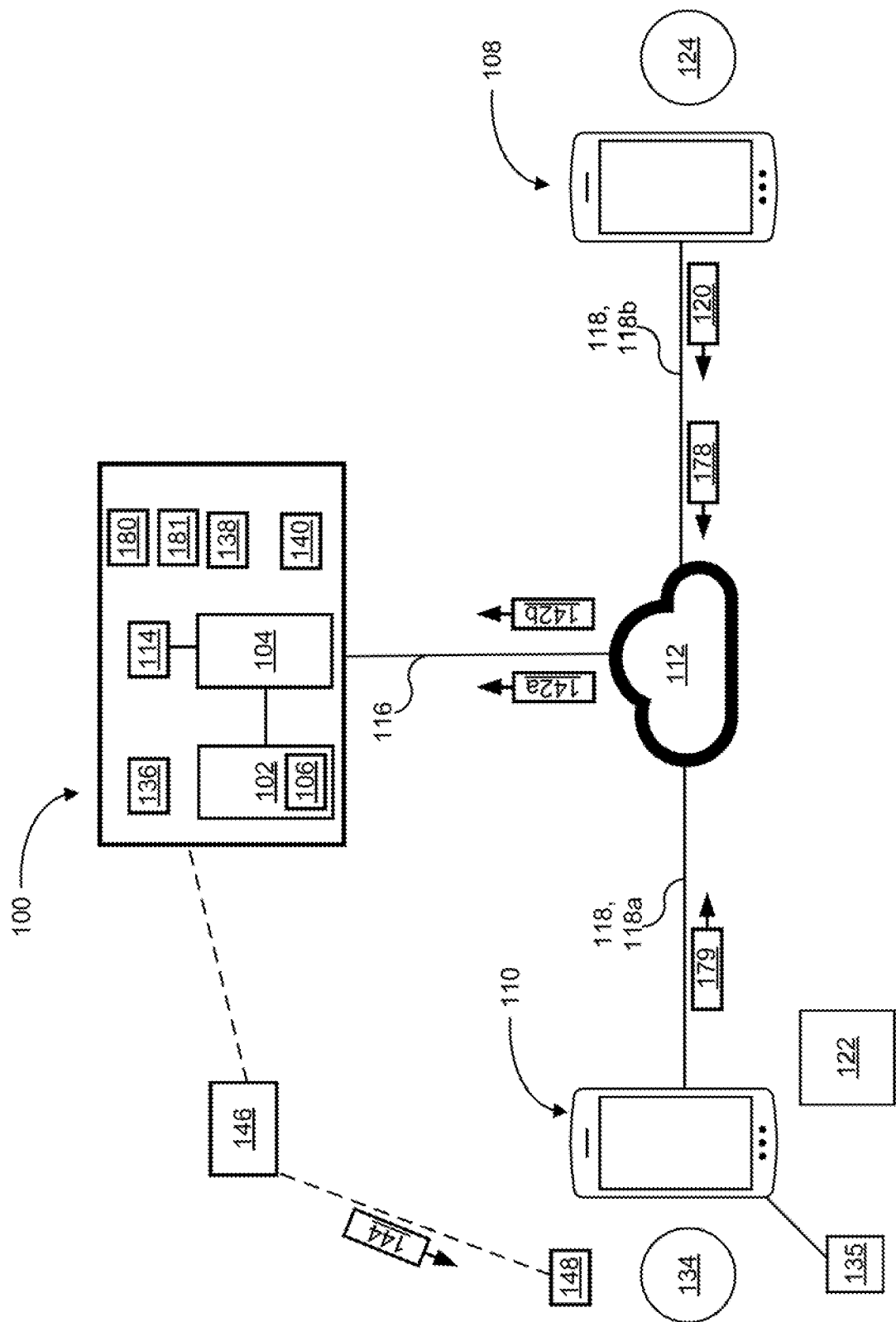
FIG. 1 depicts a schematic of a computing system for effecting a secure transaction, according to non-limiting embodiments.

Herein described are systems and methods for effecting secure transactions between two entities. It will be appreciated that for simplicity and clarity of illustration, where considered appropriate, reference numerals may be repeated among the figures to indicate corresponding or analogous elements. In addition, numerous specific details are set forth in order to provide a thorough understanding of the exemplary aspects of the present application described herein. However, it will be understood by those of ordinary skill in the art that the exemplary aspects described herein may be practiced without these specific details. In other instances, well-known methods, procedures and components have not been described in detail so as not to obscure the exemplary aspects described herein. Also, the description is not to be considered as limiting the scope of the exemplary aspects described herein. Any systems, method steps, components, parts of components, and the like described herein in the singular are to be interpreted as also including a description of such systems, method steps, components, parts of components, and the like in the plural, and vice versa.

It will also be understood that for the purposes of this application, "at least one of X, Y, and Z" or "one or more of X, Y, and Z" language can be construed as X only, Y only, Z only, or any combination of two or more items X, Y, and Z (e.g., XYZ, XYY, YZ, ZZ).

In the present application, components may be described as being "configured to" or "enabled to" perform one or more functions. Generally, it is understood that a component that is configured to or enabled to perform a function is configured to or enabled to perform the function, or is suitable for performing the function, or is adapted to perform the function, or is operable to perform the function, or is otherwise capable of performing the function.

As described above, in an increasingly digital world, more and more individuals are often not carrying cash; however, cash is still a preferred method of payment for many daily transactions. Individuals may find themselves in a situation where the purchase must be made in cash, but it may not be convenient or easy to access an ATM or bank branch at the individual's present time and location.

Although some vendors offer debit or credit cashback services (i.e., a service whereby an amount is added to the total purchase price of a transaction paid by debit or credit card and the customer received that amount in cash along with the purchase), usually an individual must make a purchase at the vendor as a condition for receiving cash back. Many current retail electronic financial transaction services are not usually set up to convert between electronic funds transfers and cash transfers without an underlying purchase or sale transaction.

If another individual or entity possesses or has access to cash and is willing to provide this cash to the purchaser, a few concerns arise. One concern is how to match the purchaser with the individual or entity willing to deliver or provide the cash, particularly if the two entities are not geographically proximate or their respective locations are unknown to one or both entities. Another consideration is how to ensure that neither party is an imposter, and that the cash being provided is not counterfeit and is in the form or of the value needed by the purchaser. How to quickly and accurately reimburse the individual or entity that is providing or delivering the cash must also be taken into account. Since the two entities are likely unrelated and/or unknown to each other, effecting the transaction in a secure manner is very important.

Attention is directed to FIG. 1, which depicts example computing system 100 for effecting a secure transaction. Computing system 100 (also referred to herein as intermediary computing system 100) comprises at least one memory, such as memory 102, and at least one processing device, such as processing device 104. Memory 102 can comprise any suitable memory device, including but not limited to any suitable one of, or combination of, a local and/or remote volatile memory, non-volatile memory, random access memory (RAM), read-only memory (ROM), hard drive, optical drive, buffer(s), cache(s), flash memory, magnetic computer storage devices (e.g. hard disks, floppy disks, and magnetic tape), optical memory ((e.g., CD(s) and DVD(s)), and the like. Other suitable memory devices are within the scope of the application. As such, it is understood that the term "memory", or any variation thereof, as used herein may comprise a tangible and non-transitory computer-readable medium (i.e., a medium which does not comprise only a transitory propagating signal per se) comprising or storing computer-executable instructions, such as computer programs, sets of instructions, code, software, and/or data for execution of any method(s), step(s) or process(es) described herein by any processing device(s) and/or microcontroller(s) described herein. Memory 102 comprises or is enabled to store computer-executable instructions 106 for execution by processing device 104.

Processing device 104 is coupled to memory 102 and is enabled to control at least some of the operations computing system 100. As used herein, the terms "processing device", "processing devices", "processing device(s)", "processor", "processors" or "processor(s)" may refer to any combination of processing devices, and the like, suitable for carrying out the actions or methods described herein. For example, processing device 104 may comprise any suitable processing device, or combination of processing devices, including but not limited to a microprocessor, a central processing unit (CPU) and the like. Other suitable processing devices are within the scope of the application.

Although computing system 100 is depicted as a single computing system, it is understood that according to some embodiments of the application system 100 may comprise multiple computing systems and/or computing devices in which one or more of the computing systems and/or computing devices may be co-located and/or remote from each other (e.g., one or more servers, mobile devices and other suitable computing devices). According to some embodiments, memory 102 and processing device 104 are remote from each other.

Computing system 100 is enabled to communicate with at least one computing device and/or system, such as requesting entity computing system 108 and delivery entity computing system 110, via at least one network, such as network 112. According to some embodiments, network 112 comprises one or more secure networks. Although FIG. 1 depicts a single entity computing system 108 and a single delivery entity computing system 110, according to some embodiments, requesting entity computing system 108 is one of a plurality of requesting computing systems and/or delivery entity computing system 110 is one of a plurality of delivery entity computing systems registered to deliver one or more requested payloads.

Computing system 100, requesting entity computing system 108 and delivery entity computing system 110 comprise any suitable device, or combination of devices, including but not limited to one or more portable electronic devices, mobile computing devices, portable computing devices, tablet computing devices, laptop computing devices, PDAs (personal digital assistants), cellphones, smartphones, computer terminals and the like. Other suitable computing devices are within the scope of the application. For example, according to some embodiments, requesting entity computing system 108 and delivery entity computing system 110 are smartphone computing devices and computing system 100 is a server remote from requesting entity computing system 108 and delivery entity computing system 110.

According to some embodiments, computing system 100 comprises a communication module 114 coupled to processing device 104. Communication module 114 is enabled to access network 112 via, for example, communication link 116 and communication links 118a, 118b (collectively, communication links 118).

Communication module 114 comprises any communication device(s) and/or application(s), or combination thereof, suitable for performing the communications with requesting entity computing system 108 and delivery entity computing system 110 described herein. Communication links 116, 118 comprise any suitable wired and/or wireless communication link(s), or suitable combination thereof. Communication module 114 is also enabled to communicate according to any suitable protocol which is compatible with network 112. Non-limiting examples of suitable protocols which may be compatible with network 112 are wireless protocols, cell-phone protocols, wireless data protocols, WiFi protocols, WiMax protocols, and/or a combination, or the like, such as Wired Equivalent Privacy (WEP), Wi-Fi Protected Access (WPA), Secure Sockets Layer (SSL) and Transport Layer Security (TLS). Communication module 114 is also enabled to process data for transmission between requesting entity computing system 108 and delivery entity computing system 110.

Figure 2:
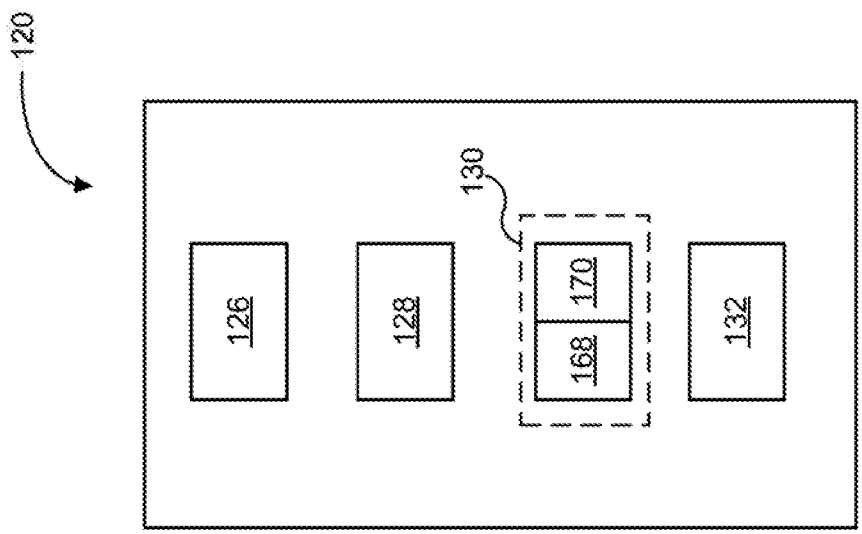
FIG. 2 depicts a transaction request to receive at least one payload, according to non-limiting embodiments.

In accordance with computer-executable instructions 106, processing device 104 is enabled to receive, over network 112, a transaction request 120 to receive at least one payload, such as payload 122, from requesting entity computing system 108 associated with a requestor entity, such as requestor entity 124. Transaction request 120 comprises a requesting entity identifier 126, a requestor geographic location identifier 128, at least one transaction payload attribute 130 and at least one transaction attribute 132 (FIG. 2).

According to some embodiments, the requesting entity identifier 126 is a client number; however, any suitable manner of uniquely identifying the requestor entity 124 and/or the requesting entity computing system 108 to the computing system 100 is contemplated.

According to some embodiments, the delivery entity computing system 110 is also associated with a delivery entity identifier 135. According to some embodiments, the delivery entity identifier 135 comprises a delivery entity registration number generated by the computing system 100; however, any suitable manner of uniquely identifying the delivery entity 134 and/or the delivery entity computing system 110 to the computing system 100 is contemplated.

According to some embodiments, the requestor geographic location identifier 128 is one of a current geographic location of the requestor entity 124 and/or the requesting entity computing system 108 and a selected location. For example, according to some embodiments, the requesting entity computing system 108 comprises a Global Positioning System (GPS) tracking unit and the current geographic location of the requesting entity computing system 108 is based on geographic co-ordinates of the requesting entity computing system 108 as determined by the GPS. According to some embodiments, the selected location may be a predetermined location for the requestor entity 124 and the delivery entity 134 to meet to effect the transaction, such as a specific location selected by the requestor entity 124 via an input device associated with the requesting entity computing system 108. According to some embodiments, the selected location is a geographic location identified or suggested by computing system 100. For example, according to some embodiments, computing system 110 predicts a geographic location for the transaction to be effected based on at least one of: a previously selected geographic location, a previously identified preferred geographic location and characteristics associated with the current geographic location of the requesting entity computing system 108 and/or the requestor entity 124 (such as the geographic distance of requesting entity computing system 108 from a geographic location of the delivery entity computing system 110, whether the current location of the requesting entity computing system 108 and/or the requestor entity 124 is a public space).

According to some embodiments, the at least one transaction attribute 132 comprises one or more of a delivery time, receipt instructions and a preferred payment method for the payload reimbursement 144 (such as a preferred bank account associated with the delivery entity 134).

According to some embodiments, the at least one transaction payload attribute 130 comprises one or more of a payload type 168 and a payload monetary valuation 170. For example, according to some embodiments, the payload type 168 indicates that the requested delivery is for cash and the payload monetary valuation 170 indicates the total monetary value of the cash to be delivered from the delivery entity 134 to the requestor entity 124. However, as discussed further below, the at least one transaction payload attribute 130 may be utilized to characterize a variety of transaction payloads.

As discussed above, the systems and methods herein can be utilized to effect a secure transaction of a variety of goods between multiple entities. For example, according to some embodiments, the transaction payload comprises one or more of cash and gold bullion.

According to some embodiments, requesting entity computing system 108 (and/or requestor 124) and delivery entity computing system 110 (and/or delivery entity 134) are not geographically proximate when, for example, transaction request 120 is transmitted to computing system 100. In general, the geographic location of requesting entity computing system 108 (and/or of the requestor entity 124) as indicated by the requestor geographic location identifier 128 does not match the geographic location of delivery entity computing system 110 (and/or of the delivery entity 134) (for example, the requesting entity computing system 108 and the delivery entity computing system 110 are not co-located or close enough to each other to effect the transaction). According to some embodiments, the proximity of between the geographic location of the delivery entity computing system 110 (and/or of the delivery entity 134) and the geographic location of the requesting entity computing system 110 (and/or requestor entity 124) are unknown when the transaction request 120 is transmitted to the computing system 100.

Processing device 104 is also enabled to transmit transaction request 120 over network 112 to the delivery entity computing system 110, which is associated with a delivery entity, such as delivery entity 134, the delivery entity identifier 135 and a delivery entity geographic location.

One way to provide as least some security for the transaction is the inclusion of measures to ensure that the requesting entity 124 and the delivery entity 134 are the true and actual parties to the transaction (i.e., that neither the requesting entity 124 nor the delivery entity 134 are impostors). With that in mind, according to some embodiments, the systems and methods described herein comprise features to help authenticate the requesting entity 124 and the delivery entity 134.

As shown in FIG. 1, processing device 104 is also enabled to generate an encryption key 136, a random number 138 and a unique request identifier 140.

According to some embodiments, encryption key 136 is a symmetric key. Any suitable, secure key generating algorithm is contemplated. For example, according to some embodiments, encryption key 136 is generated using Twofish, the Advanced Encryption Standard (AES) or Serpent ciphers or standards Processing device 104 is further enabled to transmit at least a portion of the encryption key 136, the random number 138 and the unique request identifier 140 to each of the requesting entity computing system 108 and the delivery entity computing system 110 over network 112.

According to some embodiments, and as discussed in more detail further below, one or more of computing system 100, delivery entity computing system 110 and requesting entity computing system 108 perform certain verification tasks prior to the transfer of payload 122 from the delivery entity 134 to the requestor entity 124.

As shown in FIG. 1, processing device 104 is further enabled to receive, over network 112, a delivery transaction confirmation 142a from the delivery entity computing system 110. According to some embodiments, delivery transaction confirmation 142a indicates the completion of a certain verification task and/or a request for authentication or verification of another entity and/or of aspects of the transaction.

In response to receiving the delivery transaction confirmation 142a from delivery entity computing system 110, processing device 104 is further enabled to verify the transaction. For example, according to some embodiments, the processing device 104 is further enabled to verify one or more of the identity of the requestor entity 124, the at least one payload attribute 130 and the at least one transaction attribute 132. Examples of how processing device 104 may carry out the verification are described further below.

Processing device 104 is further enabled to receive, over network 112, a requestor transaction confirmation 142b from the requesting entity computing system 108. Requestor transaction confirmation 142b indicates a verified transfer of payload 122 from the delivery entity 134 to the requestor entity 124. In response to the receipt of requestor transaction confirmation 142b from the requesting entity computing system 108, processing device 104 is enabled to transfer a payload reimbursement 144 from a requestor transaction account 146 associated with the requestor entity 124 to a delivery transaction account 148 associated with the delivery entity 134.

Figure 3A:
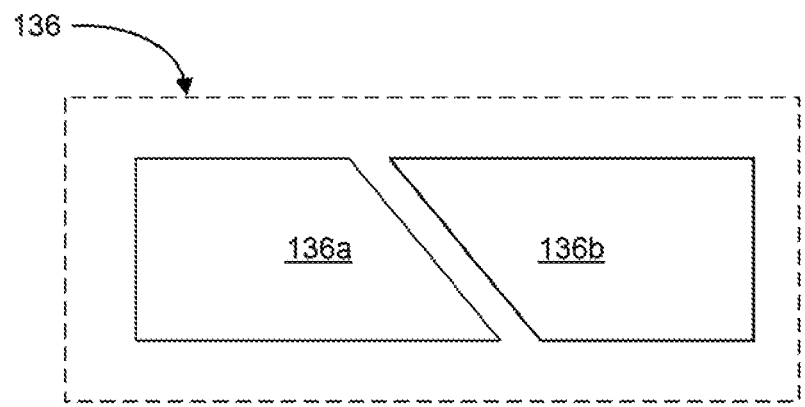
FIGS. 3A to 3D depict schematics of a split encryption key, generated matrix codes and other aspects of a computing system for effecting a secure transaction, according to non-limiting embodiments.
Figure 3B:
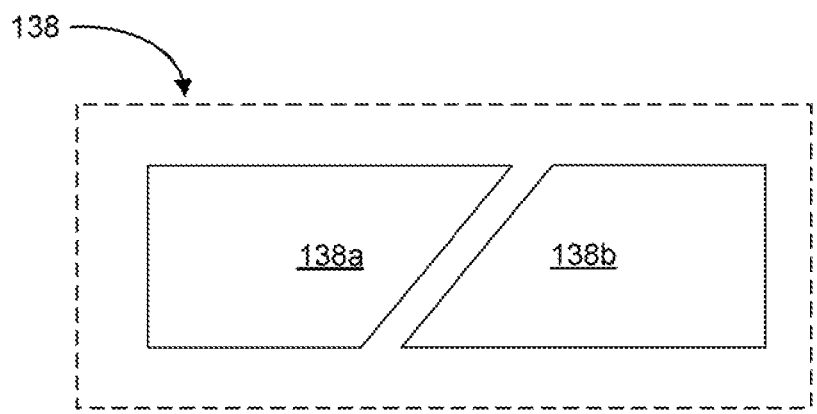
Figure 3C:
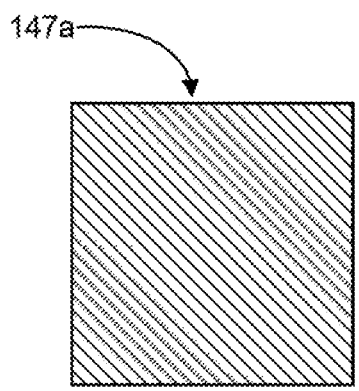
Figure 3D:
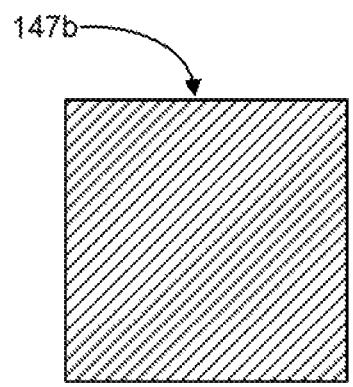

As described above, the systems and methods described herein comprise features to help ensure that the delivery entity 134 and the requestor entity 124 are the true and actual parties to the transaction (i.e., not impostors or delivery/requestor entities associated with a different transaction). According to some embodiments, and in accordance with the computer executable instructions 106, processing device 104 is enabled to split the encryption key 136 into at least two portions, a requestor entity key portion 136b and a delivery entity key portion 136a, and the random number 138 into a requestor entity number portion 138b and a delivery entity number portion 138a (FIGS. 3A and 3B). Processing device 104 is further enabled to generate a requestor matrix code 147b comprising the requestor entity number portion 138b, the unique request identifier 140, the requesting entity identifier 126 and the requestor entity key portion 136b. Processing device 104 is further enabled to generate a delivery matrix code 147a comprising the delivery entity number portion 138a, the unique request identifier 140, the delivery entity identifier 135 and the delivery entity key portion 136a (FIGS. 3C and 3D). In transmitting at least a portion of the encryption key 136, the random number 138 and the unique request identifier 140 to the requesting entity computing system 108 and the delivery entity computing system 110 over network 112, according to some embodiments, processing device 104 transmits the requestor matrix code 147b to the requesting entity computing system 108 and transmits the delivery matrix code 147a to the delivery entity computing system 110.

Requestor matrix code 147b and delivery matrix code 147a comprise any suitable type of matrix code, such as a two-dimensional matrix code. According to some embodiments, one or more of the requestor matrix code 147b and the delivery matrix code 147a is a QR code, an Aztec Code, a data matrix, a MaxiCode or a ShotCode.

Figure 5:
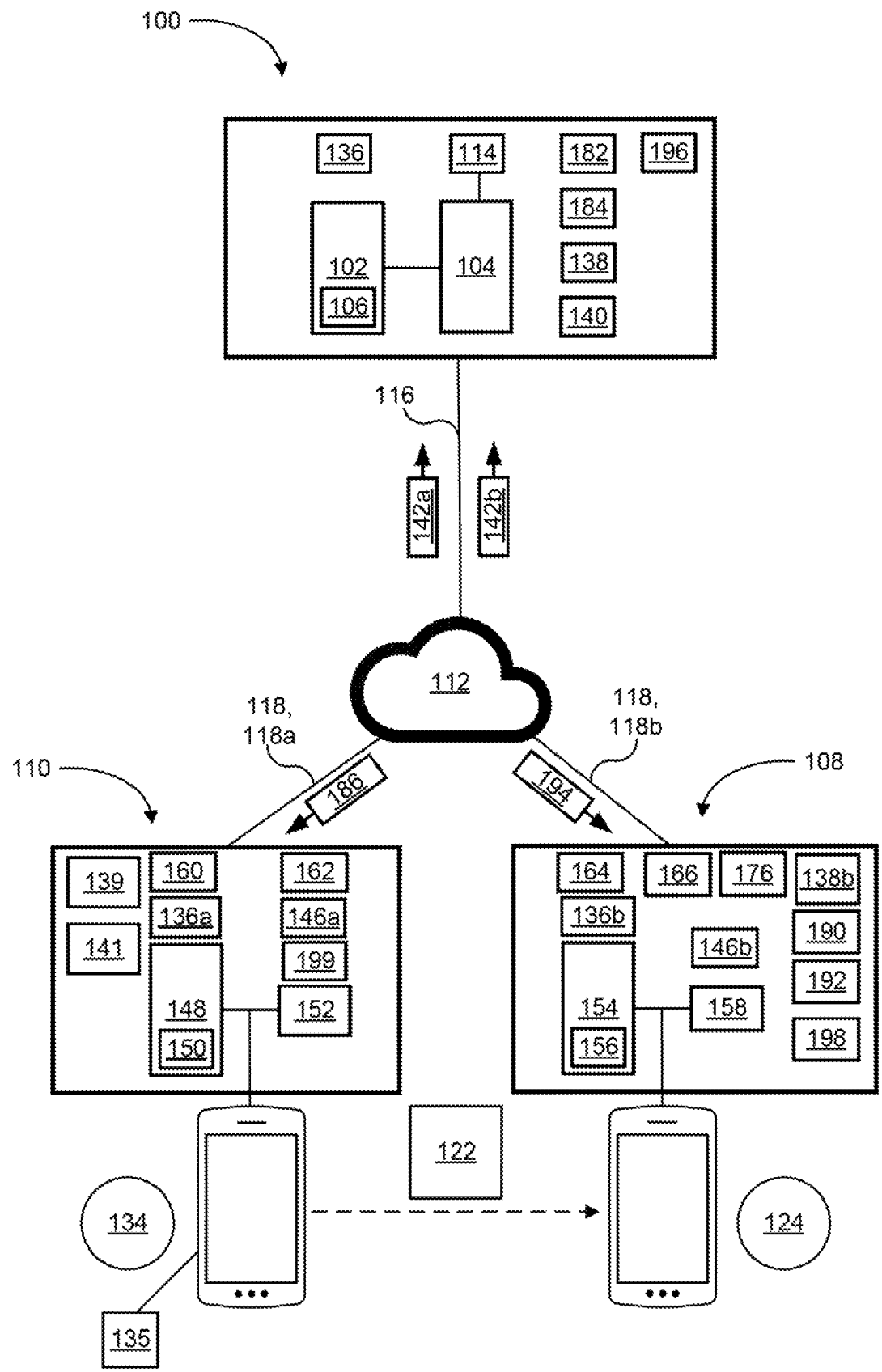
FIGS. 5 and 6 depict schematics of aspects of a computing system for effecting a secure transaction, according to non-limiting embodiments.

Attention is directed to FIG. 5, which depicts features of delivery entity computing system 110 and requesting entity computing system 108, according to non-limiting embodiments. Delivery entity computing system 110 comprises memory 148 which stores or is enabled to store computer-executable instructions 150 and processing device 152 coupled to memory 148. Requesting entity computing system 108 comprises memory 154 storing or enabled to store computer-executable instructions 156 and processing device 158.

Memory 148 and memory 154 can comprise any suitable memory devices, including but not limited to any suitable one of, or combination of, a local and/or remote volatile memory, non-volatile memory, random access memory (RAM), read-only memory (ROM), hard drive, optical drive, buffer(s), cache(s), flash memory, magnetic computer storage devices (e.g. hard disks, floppy disks, and magnetic tape), optical memory ((e.g., CD(s) and DVD(s)), and the like. Other suitable memory devices are within the scope of the application. As such, it is understood that the term "memory", or any variation thereof, as used herein may comprise a tangible and non-transitory computer-readable medium (i.e., a medium which does not comprise only a transitory propagating signal per se) comprising or storing computer-executable instructions, such as computer programs, sets of instructions, code, software, and/or data for execution of any method(s), step(s) or process(es) described herein by any processing device(s) and/or microcontroller(s) described herein.

Processing device 152 and processing device 158 are enabled to control at least some of the operations delivery entity computing system 110 and requesting entity computing system 108, respectively. As used herein, the terms "processing device", "processing devices", "processing device(s)", "processor", "processors" or "processor(s)" may refer to any combination of processing devices, and the like, suitable for carrying out the actions or methods described herein. For example, processing devices 148, 158 may comprise any suitable processing device, or combination of processing devices, including but not limited to a microprocessor, a central processing unit (CPU) and the like. Other suitable processing devices are within the scope of the application.

When requesting entity computing system 108 and delivery entity computing system 110 are geographically proximate, in accordance with the requestor geographic location identifier 128, delivery entity 134 takes steps to verify that the requestor entity 124 is the proper recipient of payload 122, the proper requestor entity identified in the transaction request is requestor entity 124 and/or that processing device 104 is able to effect reimbursement to delivery entity 134 for the transfer of payload 122. Hence, according to some embodiments, processing device 152 of the delivery entity computing system 110 is enabled to, in accordance with computer-executable instructions 150: read the requestor matrix code 146b to obtain the requestor key entity portion 136b and the requestor entity number portion 138b; combine the obtained requestor entity key portion 136b with the delivery entity key portion 136a to obtain a complete delivery encryption key 160, and combine the obtained requestor entity number portion 138b with the delivery entity number portion 138a to obtain a complete delivery random number 139; generate a delivery cryptogram 141 based on the complete delivery encryption key 160, the complete delivery random number 139, the unique request identifier 140, the requesting entity identifier 126, the at least one transaction payload attribute 130 and the at least one transaction attribute 132. According to some embodiments, processing device 152 is enabled to read the requestor matrix code 146b when generated for display at a graphical user interface (GUI) of requesting entity computing system 108. According to some embodiments, the delivery transaction confirmation 142a comprises the delivery cryptogram 141 in that transmitting the delivery confirmation 142a comprises transmitting the delivery cryptogram 141 to processing device 104.

As discussed above, in response to the receipt of the delivery transaction confirmation 142a the processing device 104 verifies the transaction. According to some embodiments, in verifying the transaction, processing device 104 is further enabled to generate a verification cryptogram 182 based on the encryption key 136, the random number 138, the unique request identifier 140, the requesting entity identifier 126, the delivery entity identifier 135, the at least one transaction payload attribute 130 and the at least one transaction attribute 132. Using the encryption key 136, processing device 104 decrypts both the received delivery cryptogram 141, thereby generating a delivery cryptogram result 162, and decrypts the verification cryptogram 182, thereby generating a verification cryptogram result 184. Processing device 104 compares the delivery cryptogram result 162 to the verification cryptogram result 184. When the delivery cryptogram result 162 matches the verification cryptogram result 184, processing device 104 transmits a transaction verification confirmation 186 to the delivery entity computing system 110. If the delivery cryptogram result 162 to the verification cryptogram result 184, then the data obtained by the delivery entity computing system 110 matches that at computing system 100 in relation to the requestor entity 124 and the transaction request 120 (such as, for example, the requesting entity identifier 126, the transaction payload attribute(s) 130 and the transaction attribute(s) 132). The transaction verification confirmation 186 provides some confidence to the delivery entity 134 that the requestor entity 124 is the true requestor entity of the transaction and, according to some embodiments, that the requesting entity 124 has sufficient funds to reimburse the delivery entity 134, prior to transferring the payload 122 to the requesting entity 124.

Figure 6:
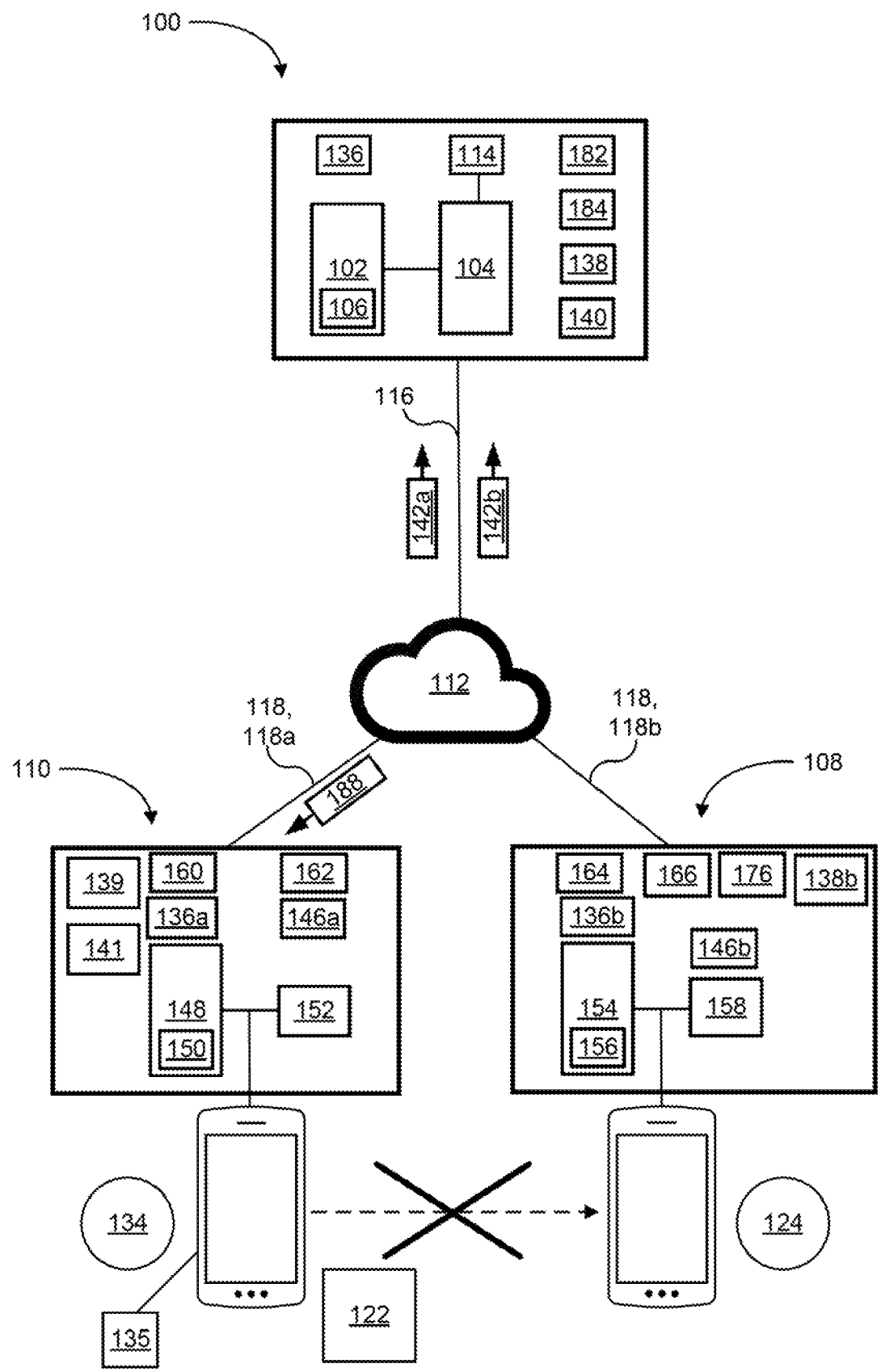

However, according to some embodiments, when the delivery cryptogram result 162 does not match the verification cryptogram result 184, processing device 104 transmits a decline transaction notification 188 to delivery entity computing system 110 (see FIG. 6). In response to receiving the decline transaction notification 188 via the delivery entity computing system 110, the delivery entity 134 would not transfer the payload 122 to the requesting entity 124.

Upon receiving payload 122, according to some embodiments, the requesting entity 124 verifies the authenticity and/or completeness of the payload. For example, according to some embodiments, payload 122 is cash having a total valuation (e.g., $75 USD). Authentic banknotes usually have serial numbers and/or other anti-counterfeit features. According to some embodiments, the after verifying the transaction, processing device 104 transmits payload verification data 194 over network 112 for receipt by processing device 158 of the requesting entity computing system 108. Payload verification data 194 comprises at least one serial number of at least one of the bank notes or bullion being delivered. According to some embodiments, the payload verification data 194 comprises a description of certain features that may be used to verify the payload (such as the type and location of certain anti-counterfeit features). According to some embodiments, processing device 158 is enabled to read at least one serial number, anti-counterfeit feature and/or other verification feature of payload 122 and compare the read serial number(s), anti-counterfeit feature(s) and/or other verification feature(s) to the at least one serial number, anti-counterfeit feature and/or other verification feature indicated by the payload verification data 194. For example, according to some embodiments, requesting entity computing system 108 further comprises a counterfeit detecting device 176 (FIG. 5). However, according to some embodiments, verifying the transfer of payload 122 is accomplished, at least in part, in the requestor entity verifying and/or confirming receipt of payload 122 and does not necessarily also include the authentication of payload 122.

Similarly to delivery entity computing system 110, when requesting entity computing system 108 and delivery entity computing system 110 are geographically proximate, in accordance with the requestor geographic location identifier 128, processing device 158 is enabled to, in accordance with computer-executable instructions 156: read the delivery matrix code 146a to obtain the delivery entity key portion 136a, the delivery entity number portion 138a and the delivery entity identifier 135. According to some embodiments, processing device 158 is enabled to read the delivery entity matrix code 146a when generated for display at a graphical user interface (GUI) of delivery entity computing system 110. Processing device 158 is further enabled to combine the obtained delivery entity key portion 136a with the requestor entity key portion 136b to obtain a complete requestor encryption key 164 and combine the obtained delivery entity number portion 138a with the requestor entity number portion 138b to obtain a complete requestor random number 190; and generate a requestor cryptogram 192 based on the complete requestor entity encryption key 164, the complete requestor random number 190, the unique request identifier 140, the requesting entity identifier 126, the transaction payload attribute(s) 130 and the transaction attribute(s) 132 (FIG. 5). Processing device 158 transmits, over network 112, the transaction confirmation 142b to processing device 104, wherein the requestor transaction confirmation 142b comprises the requestor cryptogram 192.

According to some embodiments, computing system 100 performs additional verification steps upon receipt of the transaction confirmation 142b. For example, processing device 104 may decrypt the requestor cryptogram 192, using the encryption key 136, thereby generating a requestor cryptogram result 196 and compare the requestor cryptogram result 196 with the verification cryptogram result 184. When the requestor cryptogram result 196 matches the verification cryptogram result 184, processing device 104 transfers the payload reimbursement 144 to the delivery transaction account 148. A matching requestor cryptogram 192 and verification cryptogram 182 may provide some confidence to the requestor entity 124 that the reimbursement is being transferred to the correct delivery entity. According to some embodiments, when the requestor cryptogram result 196 does not match the verification cryptogram result 184, a notification is transmitted to requesting entity computing system 108 and/or delivery entity computing system 110 and the transaction is cancelled.

Figure 4:
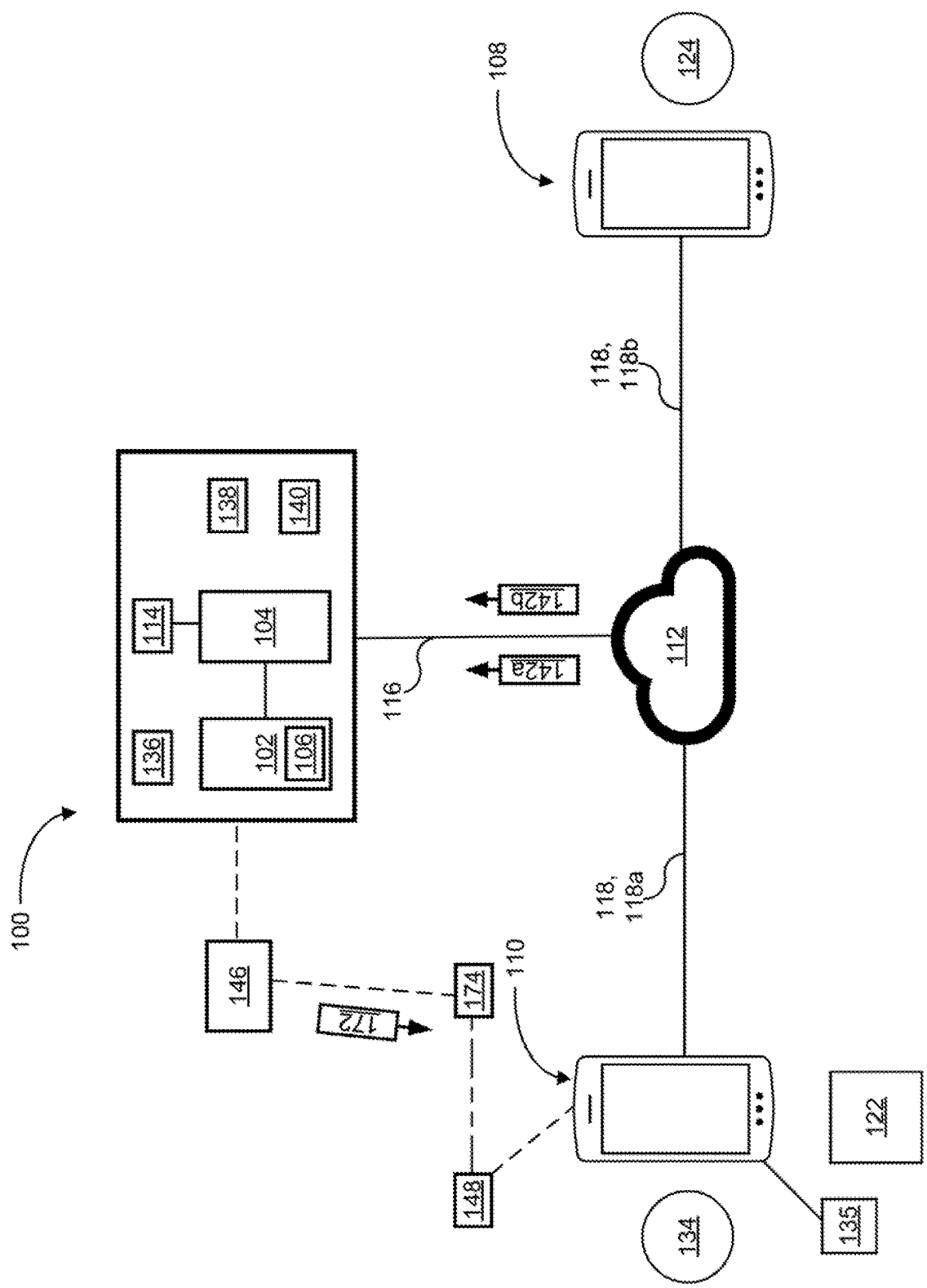
FIG. 4 depicts a schematic of a computing system for effecting a secure transaction, according to non-limiting embodiments.

As noted above, delivery entity 134 is reimbursed for the transferred payload. According to some embodiments, prior to receipt of the requestor transaction confirmation 142b from processing device 158, processing device 104 is enabled to transfer a reimbursement amount 172 from the requestor transaction account 146 to a requestor escrow account 174 (FIG. 4). In reimbursing the delivery entity 134, the reimbursement amount 172 is transferred from the requestor escrow account 174 to the delivery transaction account 148. Any suitable means of transferring the reimbursement amount 172 from the requestor transaction account 146 to the requestor escrow account 174 and/or the delivery transaction account 148 are contemplated. For example, according to some embodiments, one of more of the transfers from the requestor transaction account 146 to the requestor escrow account 174 and/or the delivery transaction account 148 is accomplished by Electronic Funds Transfer (ETF), such as Direct Deposit, Interact™ e-transfer, Real-time Payment Rail (RTR), Visa Direct™ and/or Zelle®.

The requestor entity 124 and/or delivery entity 134 may register with computing system 100 in order to request and/or deliver payloads in accordance with the systems and methods described herein. According to some embodiments, prior to receipt of the transaction request 120 and in response to receiving a requestor registration request 178 from the requesting entity computing system 108 and/or a delivery entity registration request 179, processing device 104 is enabled to generate a requestor account profile 180 based on the requestor registration request 178 and/or a delivery entity account profile 181 (FIG. 1). For example, according to some embodiments, the requestor registration request 178 comprises at least one payment method for payload 122 and, according to some embodiments, any fees associated with the transaction. According to some embodiments, the registration request 178 comprises requestor identity data, such as a government issued identity number (e.g., driver's license number) and/or a digital ID that may be managed by the service provider or a third party. According to some embodiments, the delivery entity registration request 179 comprises details identifying at least one delivery transaction account, such as delivery transaction account 148, and delivery entity identity data, such as a government issued identity number (e.g., driver's license number) and/or a digital ID that may be managed by the service provider or a third party.

Processing device 104 is further enabled to verify the at least one payment method and program eligibility of the requestor entity 124. For example, according to some embodiments, processing device 104 is enabled to determine whether the requestor entity 124 meets a set of program eligibility criteria based on the registration request 178.

According to some embodiments, requestor entity 124 and/or delivery entity 134 are able to provide feedback about the transaction. For example, according to some embodiments, the processing device 104 is configured to receive from requesting entity computing system 108 requestor feedback data 198 indicative of one or more of a rating and a comment about the delivery entity 134. Similarly, according to some embodiments, processing device 104 is configured to receive from delivery entity computing system 110 delivery feedback data 199 indicative of one or more of a rating and a comment about the requestor entity 124.

Figure 7:
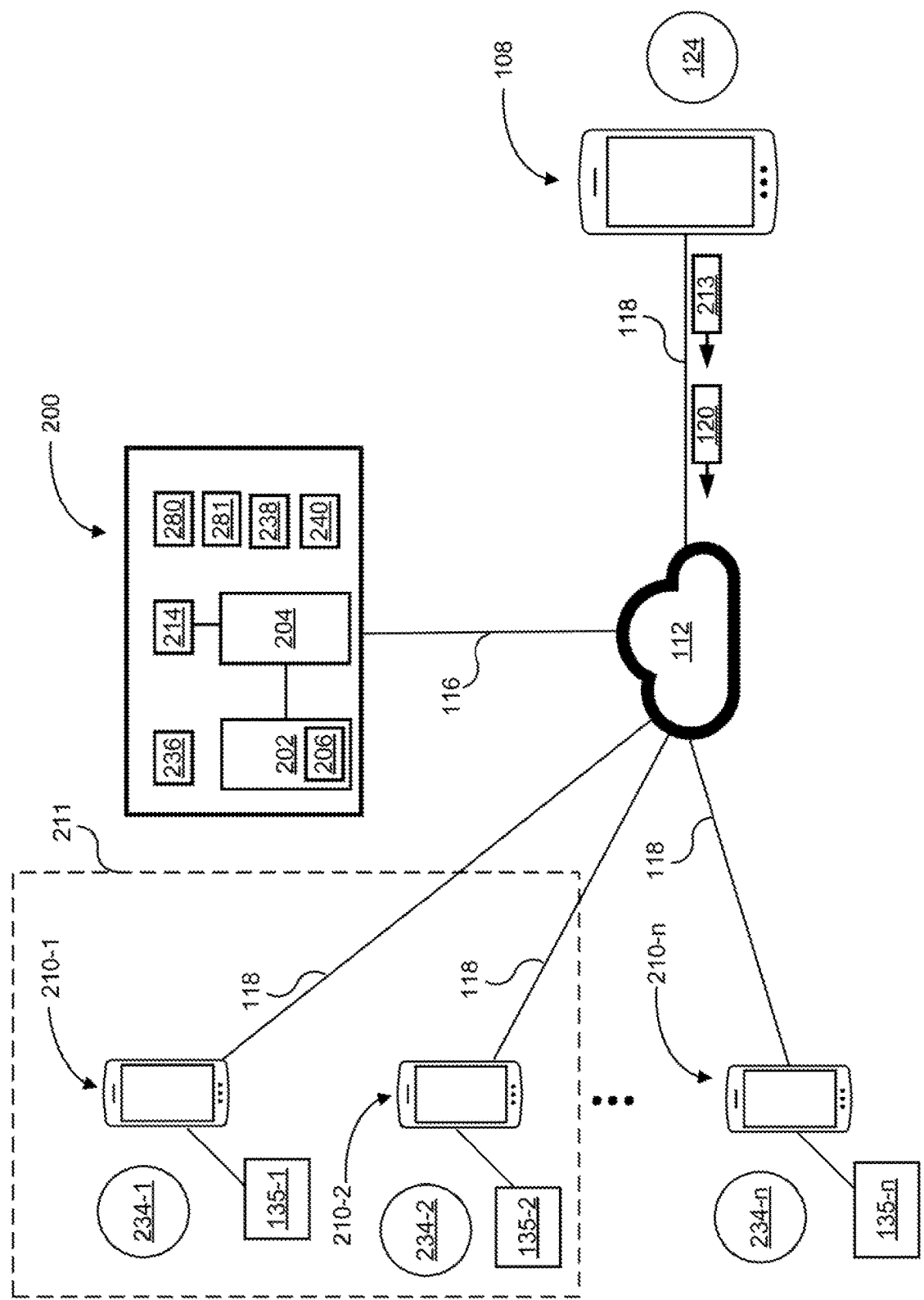
FIG. 7 depicts a schematic of a computing system for effecting a secure transaction, according to non-limiting embodiments.

Attention is directed to FIG. 7, which depicts computing system 200 for effecting a secure transaction, according to non-limiting embodiments and in which like or similar elements are denoted by like or similar numbers in FIGS. 1 to 6. For simplicity and understanding, discussion of the systems and devices depicted in FIG. 7 will focus on certain similarities and differences from those depicted in FIG. 1.

As depicted in FIG. 7, delivery entity computing system 210-1, associated with respective delivery entity 234-1, is one of a plurality of delivery entity computing systems 210-1, 210-2 to 210-n (collectively delivery entity computing systems 210). According to some embodiments, in response to receiving transaction request 120, processing device 204 is enabled to determine which delivery entities of the plurality of delivery entities 234 (also referred to herein as delivery entity 234-1, delivery entity 234-2 to delivery entity 234-n) are available or able to fulfil transaction request 120, such as subset 211 of delivery entity computing systems 234 comprising delivery entity computing system 210-1 associated with delivery entity 234-1 and delivery entity computing system 210-2 associated with delivery entity 234-2. For example, according to some embodiments, transaction request 120 further comprises requestor criteria for the selection of a delivery entity for fulfilling the request (such as proximity to requestor geographic location identifier and delivery entity rating). According to some embodiments, based on the requestor criteria, processing device 204 is enabled to generate a list of suggested delivery entities, such as delivery entities 234-1 and 234-2, and to transmit the list over network 112 for receipt by requesting entity computing system 108. For example, the list may be generated for display at a GUI of the requesting entity computing system 108 via processing device 158. Processing device 158 may be configured to process a selection of a particular delivery entity associated with a particular delivery entity computing system, such as selected delivery entity computing system 210-2 associated with selected delivery entity 234-2 and to transmit selection data 213 indicative of that selection over network 112 for receipt by computing system 200 (via processing device 204). According to some embodiments, the transaction request 120 is transmitted to the selected delivery entity computing system 210-2.

Figure 8:
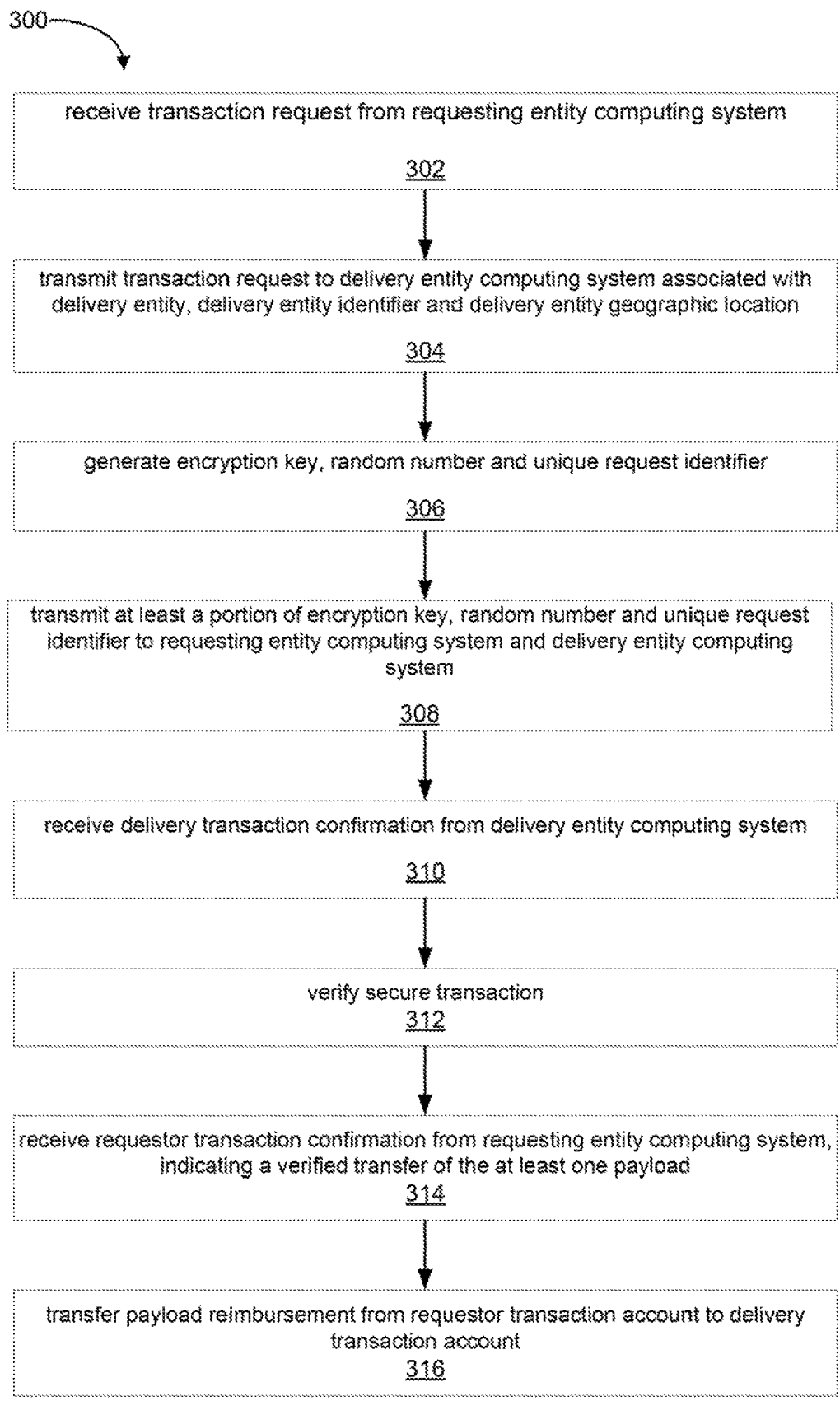
FIG. 8 depicts a flowchart of a method for effecting a secure transaction, according to non-limiting embodiments.

Attention is now directed to FIG. 8 which depicts a flowchart of a method 300 of effecting a secure transaction, according to non-limiting embodiments. In order to assist in the explanation of method 300, it will be assumed that method 300 may be performed using computing systems 100, 200, requesting entity computing system 108 and/or delivery entity computing systems 110, 210 as indicated. Furthermore, the following discussion of method 300 will lead to a further understanding of computing systems 100, 200, requesting entity computing system 108 and/or delivery entity computing systems 110, 210 and various components of those systems. However, it is to be understood that computing systems 100, 200, requesting entity computing system 108, delivery entity computing systems 110, 210 and/or method 300 can be varied, and need not work exactly as discussed herein in conjunction with each other, and that such variations are within the scope of present embodiments.

It is appreciated that, in some embodiments, method 300 is implemented computing systems 100, 200 delivery entity computing systems 110, 210 and/or requesting entity computing system 108. Indeed, method 300 is one way in which computing systems 100, 200, delivery entity computing systems 110, 210 and/or requesting entity computing system 108 may be configured. It is to be emphasized, however, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of computing system 100 or 200 delivery entity computing systems 110, 210 and/or requesting entity computing system 108.

At block 302, processing device 104 receives transaction request 120 from requesting entity computing system 108 over network 112. As described above, the transaction request 120 comprises requesting entity identifier 126, requestor geographic identifier 128, at least one transaction payload attribute 130 and at least one transaction attribute 132.

At block 304, the transaction request 120 is transmitted to delivery entity computing system 110 associated with delivery entity 134, a delivery entity identifier 135 and a delivery entity geographic location.

At block 306, processing device 104 of computing system 100 generates an encryption key, a random number and a unique request identifier, such as encryption key 136, random number 138 and unique request identifier 140.

At block 308, processing device 104 transmits at least a portion of the encryption key 136, the random number 138 and the unique request identifier 140 to each of the requesting entity computing system 108 and the delivery entity computing system 110 over network 112.

At block 310, the processing device 104 receives a delivery transaction confirmation 142a from the delivery entity computing system 110. As described above, according to some embodiments, the delivery transaction confirmation 142a indicates the completion of a certain verification task and/or a request for authentication or verification of another entity and/or of features of the transaction.

At block 312, in response to receiving the delivery transaction confirmation 142a, processing device 104 verifies the transaction.

At block 314, processing device 104 received a requestor transaction confirmation 142b from the requesting entity computing system 108. As discussed above, the requestor transaction confirmation 142b is indicative of a verified transfer of the at least one payload 122 from the delivery entity 134 to the requestor entity 124.

At block 316, after receiving the requestor transaction confirmation 142b, processing device 104 transfers payload reimbursement 144 from a requestor transaction account 146 to a delivery transaction account 148.

The systems and methods described herein may be applied to a variety of transactions involving a variety of payloads (such as products, cash and bullion). For example, according to some embodiments, the secure transaction is a person-to-person transaction in which the requestor entity is an individual requesting a payload that is provided by another individual as the delivery entity. According to some embodiments, the secure transaction is between an individual and a business. For example, the requestor entity may be a retail customer in a mall and another retail business may provide and/or deliver the requested cash. Alternatively, the retail business may require additional cash and unwilling to disrupt sales to obtain cash from an affiliated bank branch. According to some embodiments, the retail customer may provide and/or deliver the requested cash to the retail business. According to some embodiments, the secure transaction is between two businesses, where one business requires cash or another payload and another business provides the cash or other payload. For example, a requesting retail business may be running low on cash and another retail business located close by may be willing to provide the requested cash.

Illustrative Example

The following example is provided for a better understanding as to how the described systems and methods may be carried out. However, this example should not be construed as limiting the scope of the claims appended hereto.

Figure 9:
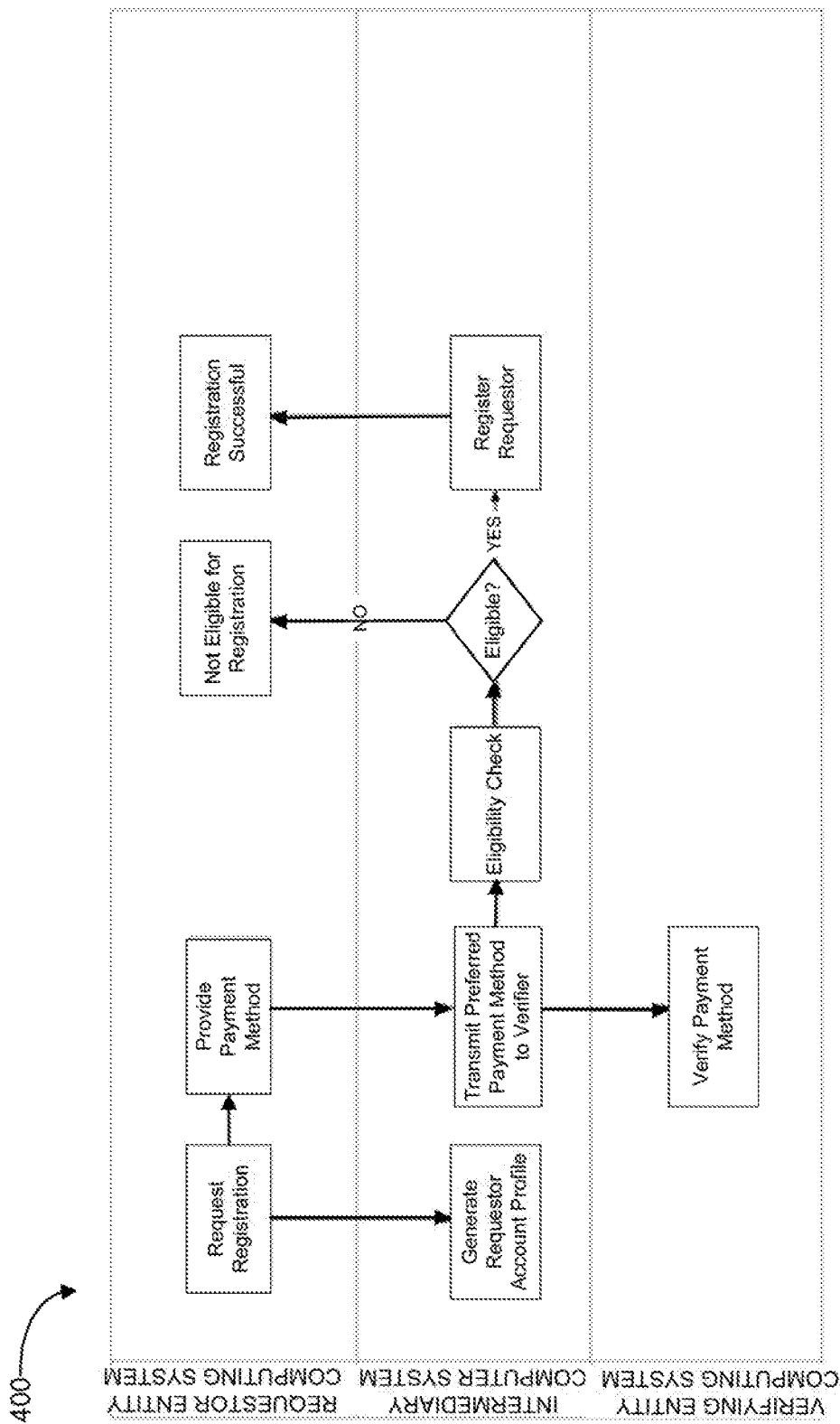
FIGS. 9 and 10 depict communication schematics of aspects of systems and methods for effecting a secure transaction, according to non-limiting embodiments.
Figure 10:
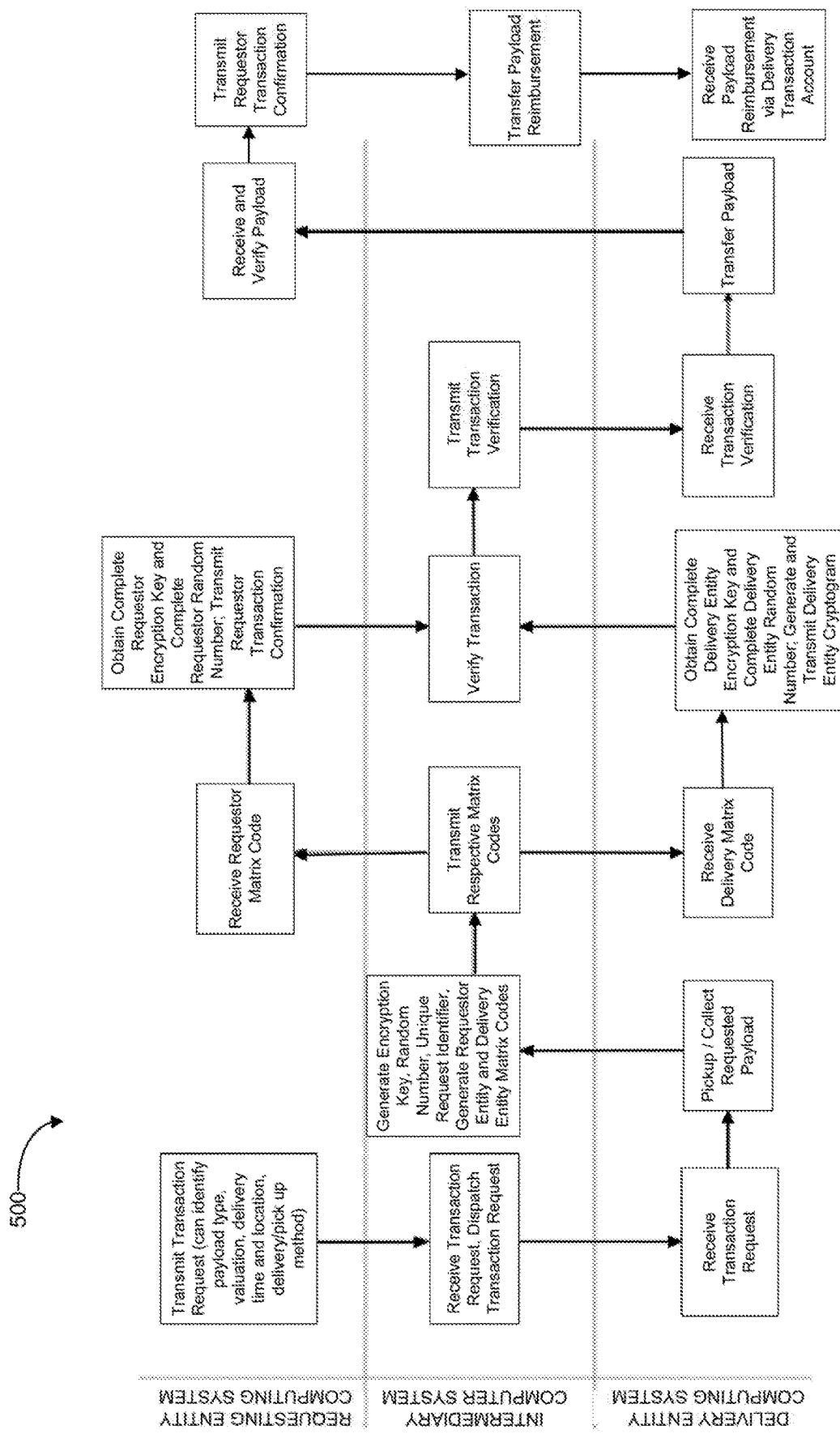

Attention is directed to FIGS. 9 and 10 which depict communication schematics of aspects of the systems and methods described herein, according to non-limiting embodiments.

FIG. 9 depicts aspects of a registration process 400 for a requestor entity (such as requestor entity 124), according to non-limiting embodiments. The requestor entity requests registration with an intermediary computing system (such as computing system 100) by transmitting a registration request from a requesting entity computing system (such as registration request 178 from requesting entity computing system 108). In response to receiving the registration request, the intermediary computing system generates a requestor account profile.

As discussed above, the registration request comprises at least one payment method for transactions via the intermediary computing system (such as a bank account associated with the requesting entity). In verifying the at least one payment method, the intermediary computing system may transmit the preferred payment method to a verifying entity enabled to verify and facilitate financial transactions (such as Interac™). After verifying the payment method, the intermediary computing system determines whether the requestor entity satisfies eligibility criteria for participating in the transaction program. For example, a verified identify may be one of the eligibility criteria. The intermediary computing system may verify the identity of the requesting identity based on information supplied to by the requestor entity via the requesting entity computing system. If the requesting entity satisfies the eligibility criteria, then the requestor entity is registered.

FIG. 10 depicts aspects of a secure transaction process 500, according to non-limiting embodiments. A requestor entity transmits a transaction request (such as transaction request 120 from requesting entity computer system 108) over a network for receipt by an intermediary computing system, such as computing system 100. After receiving the transaction request, the intermediary computing system transmits the transaction request to a delivery entity computing system associated with a delivery entity, a delivery entity identifier and a delivery entity geographic location. For example, according to some embodiments, the delivery entity associated with the delivery entity computing system is a delivery entity registered with the intermediary computing system. According to some embodiments, the delivery entity is one of a plurality of delivery entities registered with the intermediary computer system and the intermediary computing system selects one particular delivery entity of the plurality of registered delivery entities. For example, the intermediary computer system may select the particular delivery entity based on a number of criteria, including availability during requested delivery time/date and geographic proximity to the geographic location of the requestor entity. According to some embodiments, the intermediary computer system may identify a plurality of candidate delivery entities and transmit the transaction request to each of those candidate delivery entities, receive bids from those candidate delivery entities and select one of the bidding candidate delivery entities. The selected delivery entity collects the payload (e.g., travels to a bank branch and collects the requested cash payload).

As depicted in FIG. 10, the intermediary computer system generates the encryption key, a random number and a unique request identifier. According to some embodiments, the encryption key and the random number are split into a requestor entity key portion, a requestor entity number portion, a delivery entity key portion and a delivery entity number portion, and the generated requestor matrix code and the delivery matrix code comprise the respective entity key encryption portion, entity number portion, unique request identifier and requestor/delivery entity identifier. The respective matrix codes are transmitted to the requesting entity computing entity system and the delivery entity computing system.

When the requesting entity computing entity system and the delivery entity computing system are geographically proximate (close enough such that the physical payload transaction can occur, for example), the respective matrix codes are read as described above to obtain the respective completed encryption keys and random numbers. After the transaction has been verified by the intermediary computing system, and the delivery entity computing system has received notification that the transaction has been verified, the payload is transferred from the delivery entity to the requestor entity. After verifying the transfer of the payload, a requestor transaction confirmation is transmitted from the requesting entity computing system to the intermediary computing system and the payload reimbursement is transferred to the delivery transaction account.

Those skilled in the art will appreciate that in some implementations, the functionality of computing systems 100, 200 requesting entity computing system 108 and/or delivery entity computing systems 110, 210 can be implemented using pre-programmed hardware or firmware elements (e.g., application specific integrated circuits (ASICs), electrically erasable programmable read-only memories (EEPROMs), etc.), or other related components. In other implementations, the functionality of computing system 100, requesting entity computing system 108 and/or delivery entity computing system 110 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative aspects and modifications possible, and that the above examples are only illustrations of one or more aspects of the application. The scope, therefore, is only to be limited by the claims appended hereto.

What is claimed is:

1. A computing system for effecting a secure event, the computing system comprising:
    a delivery entity computing system associated with a delivery entity, a delivery entity identifier, and a delivery entity geographic location;
    a memory storing first computer-executable instructions; and
    a processing device coupled to the memory, the first computer-executable instructions when executed by the processing device causing the processing device to perform operations comprising:
        receiving, over a network, a transaction request to receive at least one payload from a requesting entity computing system associated with a requestor entity, the transaction request comprising a requesting entity identifier, a requestor geographic location identifier, at least one transaction payload attribute, and at least one transaction attribute;
        transmitting, over the network, the transaction request to the delivery entity computing system;
        generating an encryption key, a random number and a unique request identifier;
        receiving, over the network, a delivery transaction confirmation from the delivery entity computing system;
        in response to receiving the delivery transaction confirmation, verifying the secure event;
        receiving, over the network, a requestor transaction confirmation from the requesting entity computing system, the requestor transaction confirmation indicating a verified transfer of the at least one payload from the delivery entity to the requestor entity;
        after receipt of the requestor transaction confirmation, transferring a payload reimbursement from a requestor transaction account associated with the requestor entity to a delivery transaction account associated with the delivery entity;
        prior to the receipt of the transaction request:
            generating a requestor account profile in response to receiving a registration request from the requesting entity computing system, wherein the registration request comprises at least one payment method, and
            verifying the at least one payment method and program eligibility of the requestor entity;
        after the receipt of the delivery transaction confirmation:
            splitting the encryption key into a requestor entity key portion and a delivery entity key portion;
            splitting the random number into a requestor entity number portion and a delivery entity number portion;
            generating a requestor matrix code, the requestor matrix code comprising the requestor entity number portion, the unique request identifier, the requesting entity identifier, and the requestor entity key portion;

generating a delivery matrix code, the delivery matrix code comprising the delivery entity number portion, the unique request identifier, the delivery entity identifier, and the delivery entity key portion; and transmitting, over the network, the requestor matrix code to the requesting entity computing system and the delivery matrix code to the delivery entity computing system;

wherein the delivery entity computing system comprises a delivery entity memory storing second computer-executable instructions and a delivery entity processing device coupled to the delivery entity memory, the second computer-executable instructions when executed by the delivery entity processing device causing the delivery entity processing device to perform operations comprising:

when the requesting entity computing system and the delivery entity computing system are geographically proximate, in accordance with the requestor geographic location identifier;

reading the requestor matrix code to obtain the requestor entity key portion and the requestor entity number portion;

combining the obtained requesting entity key portion with the delivery entity key portion to obtain a complete delivery encryption key and combining the requestor entity number portion with the delivery entity number portion to obtain a complete delivery random number;

generating a delivery cryptogram based on the complete delivery entity encryption key, the complete delivery random number, the unique request identifier, the requesting entity identifier, the at least one transaction payload attribute and the at least one transaction attribute, wherein the delivery transaction confirmation comprises the delivery cryptogram; and transmitting, over the network, the delivery cryptogram to the processing device of the computing system for effecting the secure event; and wherein in verifying the transaction, the first computer-executable instructions when executed by the processing device of the computing system for effecting the secure event further cause the processing device to perform operations comprising:

generating a verification cryptogram based on the encryption key, the random number, the unique request identifier, the requesting entity identifier, the delivery entity identifier, the at least one transaction payload attribute and the at least one transaction attribute;

using the encryption key, decrypting both the received delivery cryptogram, thereby generating a delivery cryptogram result, and the verification cryptogram, thereby generating a verification cryptogram result;

comparing the delivery cryptogram result with the verification cryptogram result;

when the delivery cryptogram result matches the verification cryptogram result, transmitting a transaction verification confirmation to the delivery entity computing system; and when the delivery cryptogram result does not match the verification cryptogram result, transmitting a decline transaction notification to the delivery entity computing system.

2. The computing system of claim 1, wherein the at least one transaction attribute comprises one or more of a delivery time, a delivery date, receipt instructions and a preferred payment method for the payload reimbursement.

3. The computing system of claim 1, wherein the first computer-executable instructions when executed by the processing device further cause the processing device to perform operations comprising:

prior to the receipt of the delivery transaction confirmation, transfer a reimbursement amount from the requestor transaction account to a requestor escrow account; and transmit an escrow confirmation to the delivery entity computing system, wherein the transfer of the payload reimbursement comprises transferring the payload reimbursement from the requestor escrow account to the delivery transaction account.

4. The computing system of claim 1, wherein the at least one transaction payload attribute comprises one or more of a payload type and a payload monetary valuation.

5. The computing system of claim 1, the requesting entity computing system, wherein the requesting entity computing system comprising a requesting entity memory storing third computer-executable instructions and a requesting processing device coupled to the requesting entity memory, the third computer-executable instructions when executed by the requesting entity processing device cause the requesting entity processing device to perform operations comprising:

when the requesting entity computing system and the delivery entity computing system are geographically proximate, in accordance with the requestor geographic location identifier;

reading the delivery matrix code to obtain the delivery entity key portion, the delivery entity number portion and the delivery entity identifier;

combining the obtained delivery entity key portion with the requestor entity key portion to obtain a complete requestor encryption key and combine the obtained delivery entity number portion with the requestor number portion to obtain a complete requestor random number;

generating a requestor cryptogram based on the complete requestor entity encryption key, the complete requestor random number, the unique request identifier, the delivery entity identifier, the requesting entity identifier, the at least one transaction payload attribute and the at least one transaction attribute; and transmitting, over the network, the requestor transaction confirmation to the processing device of the computing system for effecting the secure event, wherein the requestor transaction confirmation comprises the requestor cryptogram; and wherein the first computer-executable instructions when executed by the processing device of the computing system for effecting the secure event further cause the processing device to perform operations comprising:

using the encryption key, decrypting the requestor cryptogram, thereby generating a requestor cryptogram result;

comparing the requestor cryptogram result with the verification cryptogram result; and when the requestor cryptogram result matches the verification cryptogram result, transferring the payload reimbursement from the requestor transaction account to the delivery transaction account.

6. The computing system of claim 1, wherein the requestor matrix code or the delivery matrix code is a QR code.

7. The computing system of claim 1, wherein the at least one payload comprises one or more of cash and gold bullion.

8. The computing system of claim 1 further comprising:
a plurality of delivery entity computing systems associated with a plurality of delivery entities;
wherein the delivery entity computing system is a selected delivery entity computing system of the plurality of delivery entity computing systems.

9. A plurality of non-transitory computer-readable media, wherein a first computer-readable medium of the plurality of computer-readable media comprises computer-executable instructions that when executed by at least a first processor causes the at least first processor to perform operations comprising:

receiving, over a network, a transaction request to receive at least one payload from a requesting entity computing system associated with a requestor entity, the transaction request comprising a requesting entity identifier, a requestor geographic location identifier, at least one transaction payload attribute and at least one transaction attribute;

transmitting, over the network, the transaction request to a delivery entity computing system associated with a delivery entity, a delivery entity identifier and a delivery entity geographic location;

generating an encryption key, a random number and a unique request identifier;

receiving, over the network, a delivery transaction confirmation from the delivery entity computing system;

in response to receiving the delivery transaction confirmation, verifying the secure transaction;

receiving, over the network, a requestor transaction confirmation from the requesting entity computing system, the requestor transaction confirmation indicating a verified transfer of the at least one payload from the delivery entity to the requestor entity;

after receipt of the requestor transaction confirmation, transferring a payload reimbursement from a requestor transaction account associated with the requestor entity to a delivery transaction account associated with the delivery entity;

prior to the receipt of the transaction request:
generating a requestor account profile in response to receiving a registration request from the requesting entity computing system, wherein the registration request comprises at least one payment method, and verifying the at least one payment method and program eligibility of the requestor entity;

after receiving the delivery transaction confirmation:
splitting the encryption key into a requestor entity key portion and a delivery entity key portion;
splitting the random number into a requestor entity number portion and a delivery entity number portion;
generating a requestor matrix code, the requestor matrix code comprising the requestor entity number portion, the unique request identifier, the requesting entity identifier and the requestor entity key portion;

generating a delivery matrix code, the delivery matrix code comprising the delivery entity number portion, the unique request identifier, the delivery entity identifier and the delivery entity key portion; and transmitting, over the network, the requestor matrix code to the requesting entity computing system and the delivery matrix code to the delivery entity computing system;

wherein a second computer-readable medium of the plurality of computer-readable media comprises computer-executable instructions that when executed by at least a second processor causes the at least second processor to perform operations comprising:

when the requesting entity computing system and the delivery entity computing system are geographically proximate, in accordance with the requestor geographic location identifier:

reading the requestor matrix code to obtain the requestor entity key portion and the requestor entity number portion;

combining the obtained requesting entity key portion with the delivery entity key portion to obtain a complete delivery encryption key and combining the requestor entity number portion with the delivery entity number portion to obtain a complete delivery random number;

generating a delivery cryptogram based on the complete delivery entity encryption key, the complete delivery random number, the unique request identifier, the requesting entity identifier, the at least one transaction payload attribute and the at least one transaction attribute, wherein the delivery transaction confirmation comprises the delivery cryptogram; and transmitting, over the network, the delivery cryptogram to the at least first processor; and wherein in verifying the transaction, the first computer-readable medium media further comprises computer-executable instructions that when executed by the at least first processor causes the at least first processor to perform operations comprising:

generating a verification cryptogram based on the encryption key, the random number, the unique request identifier, the requesting entity identifier, the delivery entity identifier, the at least one transaction payload attribute and the at least one transaction attribute;

using the encryption key, decrypting both the received delivery cryptogram, thereby generating a delivery cryptogram result, and the verification cryptogram, thereby generating a verification cryptogram result;

comparing the delivery cryptogram result with the verification cryptogram result;

when the delivery cryptogram result matches the verification cryptogram result, transmitting a transaction verification confirmation to the delivery entity computing system; and when the delivery cryptogram result does not match the verification cryptogram result, transmitting a decline transaction notification to the delivery entity computing system.

10. The non-transitory computer-readable medium of claim 9, wherein the first computer-readable medium further comprises computer-executable instructions that when executed by the at least first processor causes the at least first processor to perform operations comprising:
prior to the receipt of the transaction confirmation:
transferring a reimbursement amount from the requestor transaction account to a requestor escrow account, and
transmitting an escrow confirmation to the delivery entity computing system;
wherein transferring the payload reimbursement comprises transferring the payload reimbursement from the requestor escrow account to the delivery transaction account.

11. A method of effecting a secure event, the method comprising:
via at least a first processing device of a plurality of processing devices:
receiving, over a network, a transaction request to receive at least one payload from a requesting entity computing system associated with a requestor entity, the transaction request comprising a requesting entity identifier, a requestor geographic location identifier, at least one transaction payload attribute and at least one transaction attribute;
transmitting, over the network, the transaction request to a delivery entity computing system associated with a delivery entity, a delivery entity identifier and a delivery entity geographic location;
generating an encryption key, a random number and a unique request identifier;
transmitting, over the network, at least a portion of the encryption key, the random number and the unique request identifier to each of the requesting entity computing system and the delivery entity computing system;
receiving, over the network, a delivery transaction confirmation from the delivery entity computing system;
in response to receiving the delivery transaction confirmation, verifying the secure transaction;
receiving, over the network, a requestor transaction confirmation from the requesting entity computing system, the requestor transaction confirmation indicating a verified transfer of the at least one payload from the delivery entity to the requestor entity;
after receiving the requestor transaction confirmation, transferring a payload reimbursement from a requestor transaction account associated with the requestor entity to a delivery transaction account associated with the delivery entity;
prior to the receipt of the transaction request:
generating a requestor account profile in response to receiving a registration request from the requesting entity computing system, wherein the registration request comprises at least one payment method, and
verifying verif the at least one payment method and program eligibility of the requestor entity;
after receiving the delivery transaction confirmation:
splitting the encryption key into a requestor entity key portion and a delivery entity key portion;
splitting the random number into a requestor entity number portion and a delivery entity number portion;
generating a requestor matrix code, the requestor matrix code comprising the requestor entity number portion, the unique request identifier, the requesting entity identifier and the requesting entity key portion;
generating a delivery matrix code, the delivery matrix code comprising the delivery entity number portion, the unique request identifier, the delivery entity identifier and the delivery entity key portion; and
transmitting, over the network, the requestor matrix code to the requesting entity computing system and the delivery matrix code to the delivery entity computing system;
via at least a second processing device of the plurality of processing devices, the method further comprises, when the requesting entity computing system and the delivery entity computing system are geographically proximate, in accordance with the requestor geographic location identifier:
reading the requestor matrix code to obtain the requestor entity key portion and the requestor entity number portion;
combining the obtained requesting entity key portion with the delivery entity key portion to obtain a complete delivery encryption key and combine the requestor entity number portion with the delivery entity number portion to obtain a complete delivery random number;
generating a delivery cryptogram based on the complete delivery entity encryption key, the complete delivery random number, the unique request identifier, the requesting entity identifier, the at least one transaction payload attribute and the at least one transaction attribute, wherein the delivery transaction confirmation comprises the delivery cryptogram; and
transmitting, over the network, the delivery cryptogram to the first processing device; and
wherein in verifying the transaction, via the first processing device, the method further comprises:
generating a verification cryptogram based on the encryption key, the random number, the unique request identifier, the requesting entity identifier, the delivery entity identifier, the at least one transaction payload attribute and the at least one transaction attribute;
using the encryption key, decrypting both the received delivery cryptogram, thereby generating a delivery cryptogram result, and the verification cryptogram, thereby generating a verification cryptogram result;
comparing the delivery cryptogram result with the verification cryptogram result;
when the delivery cryptogram result matches the verification cryptogram result, transmitting a transaction verification confirmation to the delivery entity computing system; and
when the delivery cryptogram result does not match the verification cryptogram result, transmitting a decline transaction notification to the delivery entity computing system.

12. The method of claim 11 further comprising:
when the requesting entity computing system and the delivery entity computing system are geographically proximate, in accordance with the requestor geographic location identifier, via a third processing device of the plurality of processing devices:

reading the delivery matrix code to obtain the delivery entity key portion, the delivery entity number portion and the delivery entity identifier, combining the obtained delivery entity key portion with the requestor entity key portion to obtain a complete requestor encryption key and combine the obtained delivery entity number portion with the requestor number portion to obtain a complete requestor random number, generating a requestor cryptogram based on the complete requestor entity encryption key, the complete requestor random number, the unique request identifier, the delivery entity identifier, the requesting entity identifier, the at least one transaction payload attribute and the at least one transaction attribute, and transmitting, over the network, the requestor transaction confirmation to the first processing device, wherein the requestor transaction confirmation comprises the requestor cryptogram; and via the first processing device, the method further comprises:

using the encryption key, decrypting the requestor cryptogram, thereby generating a requestor cryptogram result;

comparing the requestor cryptogram result with the verification cryptogram result; and when the requestor cryptogram result matches the verification cryptogram result, transferring the payload reimbursement from the requestor transaction account to the delivery transaction account.

\* \* \* \* \*